(12) United States Patent
Amini et al.

(10) Patent No.: US 7,657,651 B2
(45) Date of Patent: Feb. 2, 2010

(54) RESOURCE-EFFICIENT MEDIA STREAMING TO HETEROGENEOUS CLIENTS

(75) Inventors: Lisa Amini, Yorktown Heights, NY (US); Pascal Frossard, Bulle (CH); Chitra Venkatramani, Roslyn Heights, NY (US); Olivier Verscheure, Harrison, NY (US); Peter Westerink, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/670,512

(22) Filed: Feb. 2, 2007

(65) Prior Publication Data

US 2007/0130359 A1 Jun. 7, 2007

Related U.S. Application Data

(63) Continuation-in-part of application No. 10/409,303, filed on Apr. 8, 2003, now abandoned.

(51) Int. Cl.
*G06F 13/00* (2006.01)

(52) U.S. Cl. ...................................... 709/233; 709/232

(58) Field of Classification Search .......... 709/231–236
See application file for complete search history.

(56) References Cited

U.S. PATENT DOCUMENTS 5,953,506 A * 9/1999 Kalra et al. ................. 709/231
6,076,109 A * 6/2000 Kikinis ....................... 709/228
6,151,632 A * 11/2000 Chaddha et al. ............. 709/231
6,154,771 A * 11/2000 Rangan et al. .............. 709/217
6,449,653 B2 * 9/2002 Klemets et al. ............. 709/231
7,003,794 B2 * 2/2006 Arye .......................... 725/100
7,010,598 B2 * 3/2006 Sitaraman et al. ........... 709/224
2003/0140159 A1 * 7/2003 Campbell et al. ........... 709/231
2006/0168290 A1 * 7/2006 Doron ......................... 709/231
2006/0179154 A1 * 8/2006 Sitaraman et al. ........... 709/228

* cited by examiner

*Primary Examiner*—Kenneth R Coulter
(74) *Attorney, Agent, or Firm*—F. Chau & Associates, LLC

(57) ABSTRACT

A resource-efficient live streaming system includes a broadcaster and a streaming server. The broadcaster receives a live feed and broadcasts a media stream to the streaming server containing several descriptions of the live feed along with control information. The broadcaster includes a stream thinner that implements a pruning algorithm. If descriptions from different streams are similar enough, one or more of them may be discarded without penalizing the quality of service perceived by the receivers. The streaming server assembles compressed data units into streams according to the control information from the broadcaster. The streaming server may also gather client feedback in order to estimate the status of the transmission channels and forwards the information to the broadcaster. The streaming server builds and streams media information to clients according to user preferences and receiver capabilities.

33 Claims, 6 Drawing Sheets

RESOURCE-EFFICIENT MEDIA STREAMING TO HETEROGENEOUS CLIENTS

CROSS-REFERENCE TO RELATED APPLICATION

This application is a continuation-in-part of U.S. patent application Ser. No. 10/409,303, filed on Apr. 8, 2003, now abandoned which is incorporated by reference herein in its entirety.

BACKGROUND OF THE INVENTION

The present invention relates generally to management of network resources, and more particularly, to techniques for providing resource-efficient live media streaming to heterogeneous clients.

Events such as sporting games, musical performances, and news reports are often made available via live media streaming. New applications for live media streaming, such as distance learning and tele-surgery, continue to emerge.

Although conventional live media streaming is useful, there exist a number of shortcomings. Currently, methods for live stream delivery have substantial bandwidth requirements. When bandwidth nears or reaches capacity it is common for data to be discarded. This often causes the information received to be of poor quality.

Various techniques for dealing with such problems have been proposed. For example, Zhang et al., "Efficient Selective Frame Discard Algorithms for Stored Video Delivery Across Resource Constrained Networks," *Proceedings of the IEEE INFOCOM Conference*, Vol. 2, pp. 472-479, 1999, discloses an optimal frame discard scheme, which minimizes the number of frames to be skipped, for given bandwidth and buffer size. However, this scheme simply discards frames and does not provide any way to replace them.

McCanne et al., "Low-complexity Video Coding for Receiver-driven Layered Multicast," *IEEE Journal on Selected Areas in Communication*, 15(6); 983-1001, August 1997, discloses a transport protocol based on RTP (Real Time Protocol), in which clients can subscribe to different layers (each one increasing the quality, but also the rate). The video layers are sent over different multicast groups, and the receiver decides to which groups it wants to subscribe, based on its available bandwidth. However, this scheme can rapidly result in bandwidth overflow at the server and is overly complex and costly to implement.

Other methods include transcoding within intermediate nodes to adapt the stream to the downstream available bandwidth, but such methods pose high computational requirements.

SUMMARY OF THE INVENTION

According to various exemplary embodiments of the present disclosure, resource-efficient live streaming systems and methods are provided. The exemplary resource-efficient live streaming systems and methods include a broadcaster and a streaming server. The broadcaster receives a live feed and broadcasts a media stream containing several descriptions of the live feed along with control information.

These descriptions have different characteristics in terms of bit-rate or structure, in order to cover the requirements of the different clients The descriptions are basically a series of compressed data units (e.g., video frames). The different encoding parameters generate several compressed descriptions of the original data units. In general, the clients receive one description for each data unit, but these descriptions can come from different compressed bitstreams.

A stream thinner can decide to send all the descriptions, one complete description and parts of the others, or any combination it will determine as being appropriate to optimally serve all the clients. The stream thinner implements a pruning algorithm based on the media content, and on the feedback it receives from the network about the actual infrastructure configuration and client capabilities. If descriptions from different streams are similar enough, one or more of them will be discarded without penalizing the quality of service perceived by the receivers.

The streaming server receives the media stream and builds and streams media information to clients according to user preferences and receiver capabilities. The streaming server assembles compressed data units into streams according to the control information. In various embodiments of the present disclosure, the streaming server also gathers client feedback in order to estimate the status of the transmission channels and forwards the information to the broadcaster.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1:
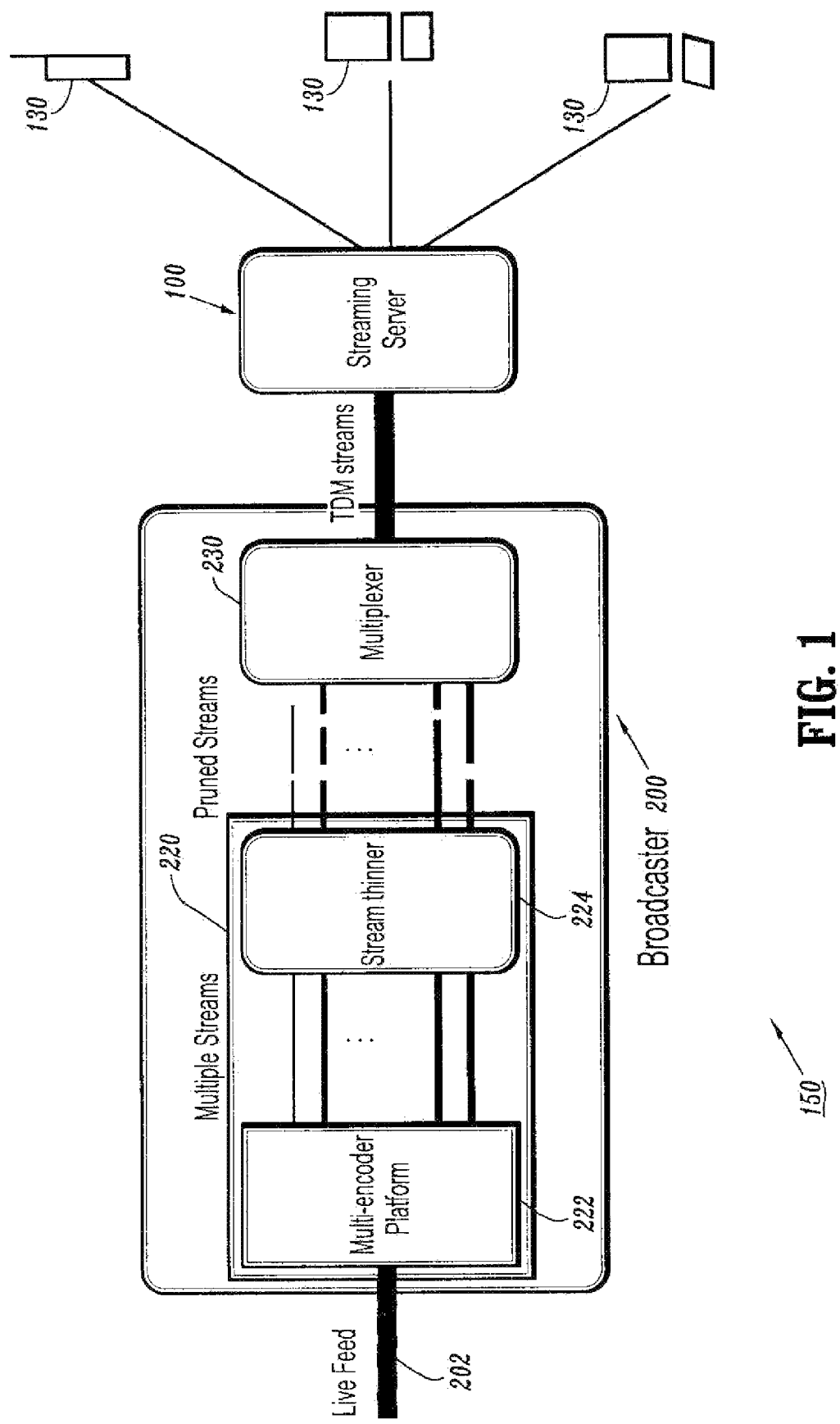
FIG. 1 shows ant exemplary resource-efficient live streaming system.

Referring to FIG. 1, an exemplary resource-efficient live streaming system 150 is illustrated. The exemplary resource-efficient live streaming system 150 includes a streaming server 100 and a broadcaster 200. The broadcaster 200 receives a live feed 202 and broadcasts a media stream containing several compressed descriptions of the live feed 202 along with control information.

The term "descriptions" as used herein refers to critical components of the media, eliminating most of the redundancies. Descriptions are of great value since they reduce the storage overhead as compared to storing full streams at different rates, and allow the thinned stream to be provided economically.

The streaming server 100 receives the media stream and builds and streams media information to clients 130 according to user preferences and receiver capabilities. The streaming server 100 assembles compressed data units into streams according to the control information from the broadcaster 200. In various embodiments of the present disclosure, the streaming server also gathers client feedback in order to estimate the status of the transmission channels and forwards the information to the broadcaster 200.

Feedback may be provided by a feedback loop that is standards based, such as, for example, the IETF standard called RTCP. Exemplary embodiments use the feedback loop in a unique way, since it drives the thinning algorithms and component selection process.

As depicted in FIG. 1, the broadcaster 200 includes a multiple output encoder 220 and a multiplexer 230. The multiple output encoder 220 includes a multi-encoder platform 222 and a stream thinner 224. The live feed 202 is input to the multi-encoder platform 222, which outputs several bitstreams of the source signal. These bitstreams have different characteristics in terms of bit-rate or structure (e.g., encoding modes), in order to cover the requirements of the different clients 130. The bitstreams are basically a series of compressed data units (e.g., video frames). The different encoding parameters generate several compressed descriptions of the original data units. In general, the clients 130 receive one description for each data unit, but these descriptions can come from different compressed bitstreams. The number of descriptions can also vary depending on the transmission conditions, and data units can even be skipped if the available bandwidth becomes too small.

Figure 2:
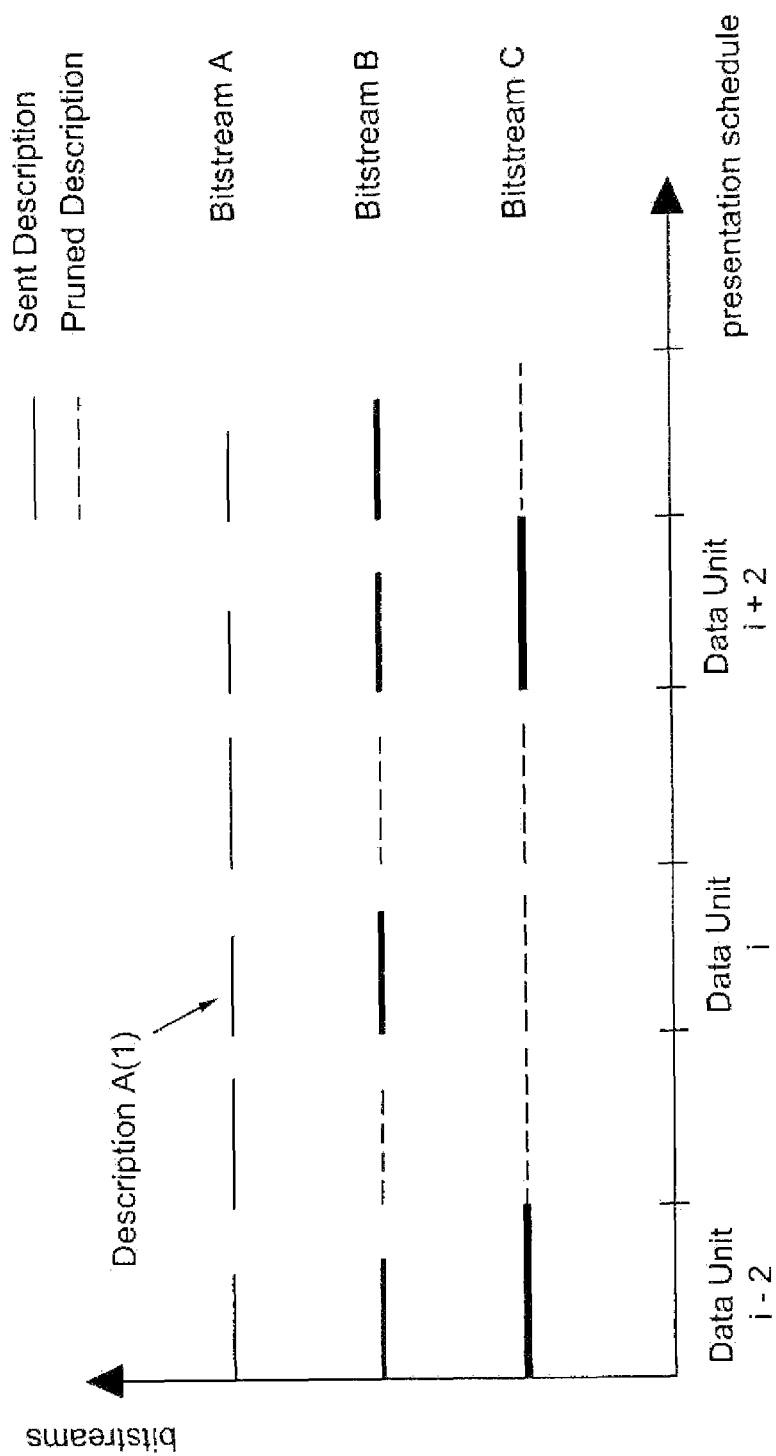
FIG. 2 shows an exemplary transmission schedule for the resource-efficient live streaming system operating in unicast mode.

The encoded bitstreams are sent to a stream thinner 220, which dynamically decides which descriptions will be sent over the network to the clients, as represented in FIG. 2. The stream thinner 220 can decide to send all the bitstreams, one complete bitstream and parts of the others, or any combination it will determine as being appropriate to optimally serve all the receivers. The stream thinner 220 implements a pruning algorithm based on the media content, and on the feedback it receives from the network about the actual infrastructure configuration and client capabilities. Basically, if descriptions from different streams are similar enough, one or more of them will be discarded without penalizing the quality of service perceived by the receivers.

The term "thinned media" as used herein refers to media that has been thinned in terms of the bandwidth required to deliver the media across a network. This thinning may be accomplished by a combination of various mechanisms, such as, for example, removing specific frames, reducing resolution, removing redundant components or very similar content components.

In most cases, the clients 130 are connected to streaming proxy servers and not directly to the stream thinner. The stream thinner 220, which can act as a streaming server too, uses the multiplexer 230 to multiplex the descriptions on a unicast-type connection to one or several proxy servers (not shown). Similar to time-division multiplexing (TDM) methods, it sends the data units required by the proxy server according to their presentation deadline, in order to keep the playback delay at a minimal value, while optimizing the quality of service for the clients 130. Based on the scenario represented in FIG. 2, the transmission schedule in the unicast scenario is given by:

$$\{\ldots, A(i-2), B(i-2), C(i-2), A(i-1), A(i), B(i), \ldots\}. \quad \text{Equation 1}$$

Figure 3:
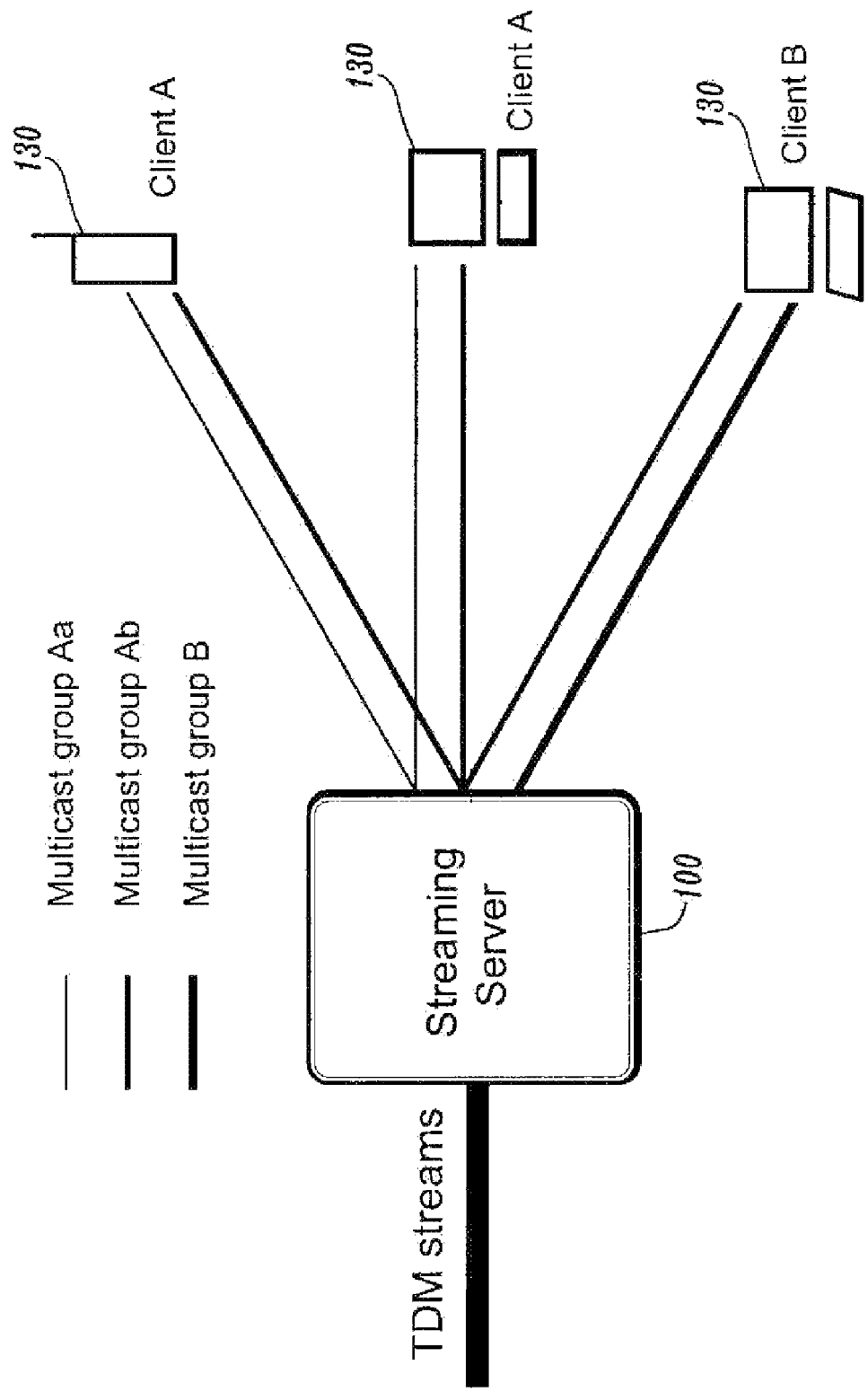
FIG. 3 shows an exemplary multicast version of the resource-efficient live streaming system.

Referring to FIG. 3 an exemplary multicast of a media stream is illustrated. As depicted, clients 130 with similar capabilities are grouped into two clusters, A and B. Clients in cluster A subscribe to multicast groups Aa and Ab, while clients in cluster B subscribe to multicast groups Ab and B. Although FIG. 2 shows two clusters, A and B, it should be appreciated that additional clusters could also be used.

Consider only streams A and B from FIG. 2. Stream Ab in FIG. 3 represents the descriptions common to both streams A and B. When Internet Protocol (IP) multicast is available, each of the descriptions Aa, Ab and B, is efficiently distributed over a multicast group, as represented in FIG. 3. The number of groups, and the distribution of the different descriptions, are driven by the network infrastructure, and the receiver requirements. The receivers subscribe to possibly several multicast groups in order to receive the complete media information, i.e., all the data units of the media stream. For example, in the case where a client receives a stream where some descriptions have been pruned, it subscribes to the group where the main stream is sent, and to the group corresponding to the descriptions replacing the pruned ones in the main stream (see FIG. 4).

The stream builder 100 ensures that clients will obtain all the data units as determined by an optimization algorithm. It forms client streams, and sends them via an IP multicast, an application-layer multicast or a pure unicast session, depending on the available network infrastructure.

The system and method disclosed herein allows for important savings in bandwidth, since it avoids the duplication of very similar descriptions. It allows service of a heterogeneous set of clients with a minimal bandwidth consumption.

An additional advantage is that the adaptive stream delivery is performed with very low complexity in the network nodes. The intermediate nodes generally only have to multiplex the different descriptions, or form different multicast groups. The complexity of such processes is very simple compared to transcoding methods generally used to serve heterogeneous receivers. The same method can be used for archiving videos, thereby providing storage efficiency.

Figure 4:
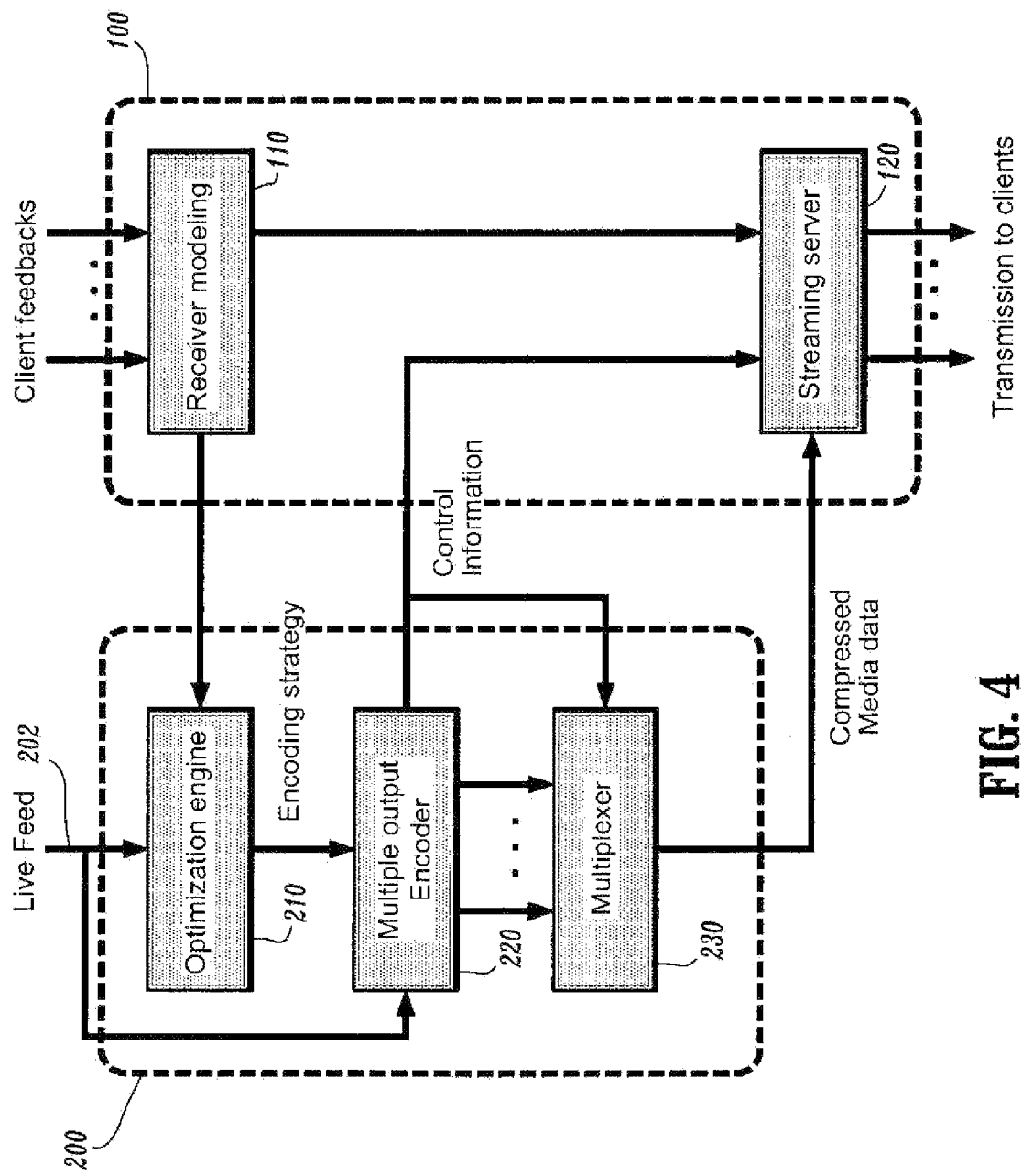
FIG. 4 shows a flow diagram for an exemplary embodiment of the resource-efficient live streaming system.

FIG. 4 illustrates an exemplary flow diagram of a preferred embodiment of the present disclosure. Each component shown in this figure will now be described.

Streaming server 100 builds and streams media information to clients according to user preferences and receiver capabilities. It does not perform any transcoding operations, but simply assembles access units into streams according to the control information from the broadcaster 200. It also gathers; client feedback in order to estimate the status of the transmission channels and forwards the information to the broadcaster 200.

Client feedback component 110 gathers client feedback, in terms of available bandwidth or transmission quality, and forward updates to the broadcaster 200.

Stream builder 120 streams media information to the clients based on the client characteristics. The stream builder assembles media streams with the access units sent by the broadcaster 200, according to the control information embedded in the stream by the broadcaster 200.

Broadcaster 200 generates possibly several compressed descriptions of the information source, in order to allow the streaming server to efficiently and adaptively serve clients with different characteristics and requirements, based on the characteristics of the receivers, and the live uncompressed sequence. It also minimizes the resource consumption in terms of storage and bandwidth requirements.

Optimization engine 210 optimally determines the number of client groups (i.e., channels), the number of compressed descriptions in each time interval, and the coding parameters of these descriptions, based on aggregate feedback from the clients forwarded by the streaming server. The optimization minimizes the resources consumption, while ensuring an good final quality to all the clients. In general, compressed descriptions which are similar up to a certain threshold measured in comparing the decoded frames are simply pruned or discarded, and only one version is kept for transmission. The value of the pruning threshold is determined by the resources available, in terms of bandwidth and/or storage. It then sends the encoding strategy to the encoder 220.

Multiple output encoder 220 encodes the uncompressed live stream into several descriptions, according to the encoding strategy determined by the optimization engine 210. The outputs of the encoder are not necessarily continuous streams, but may consist of chunks of streams instead. The stream builder 120 then is responsible for forming continuous streams with these building blocks, according to the control information sent by the broadcaster 200.

Figure 5:
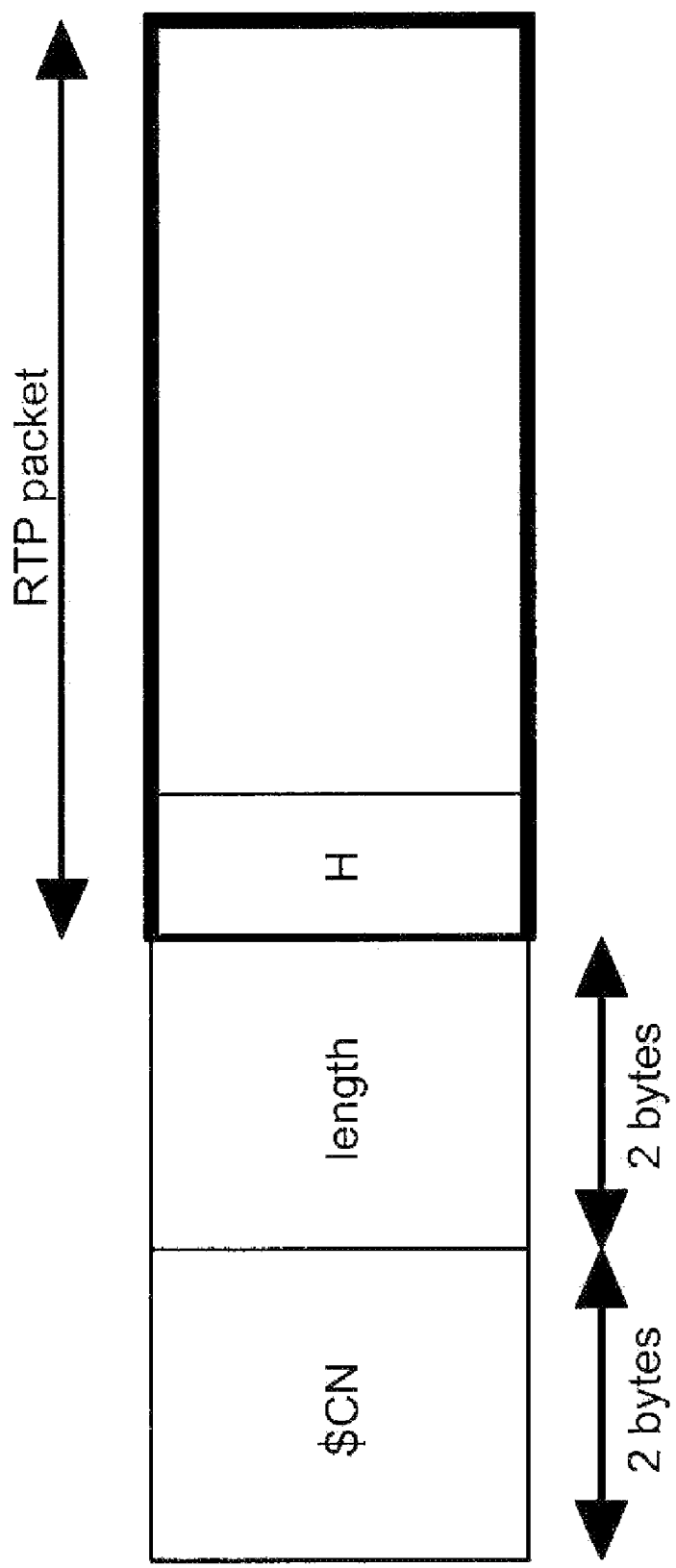
FIG. 5 shows an example of a packet generated by a TCP multiplexer.
Figure 6:
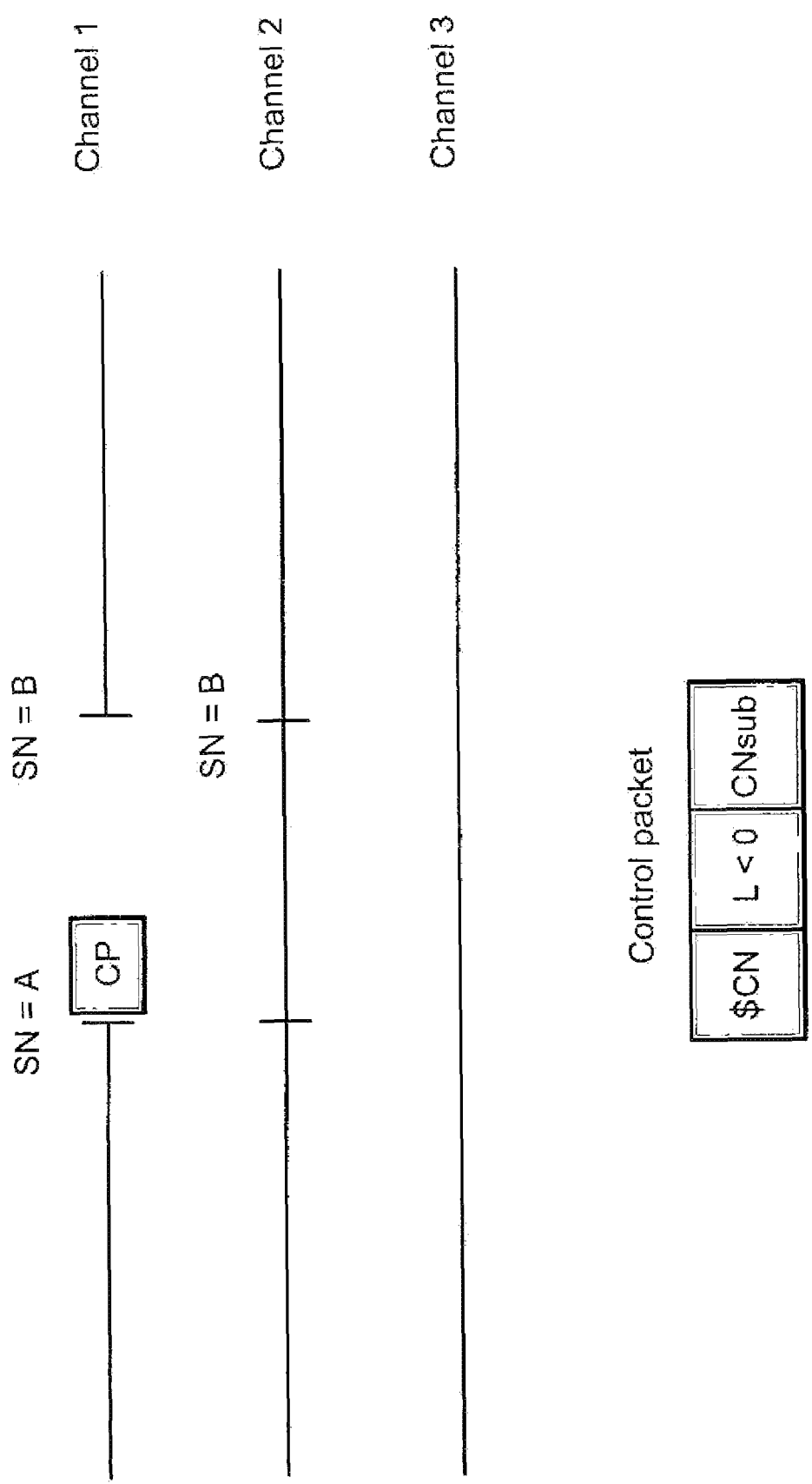
FIG. 6 shows an example of control packet generation.

Multiplexer 230 multiplexes the packetized description in a unicast-type connection to the streaming server. It sends the different descriptions in the increasing number of their decoding time-stamps. If different descriptions have the same time-stamps, it sends all these descriptions before sending descriptions with larger decoding time-stamps. If one description is missing in a given channel, it replaces it by a control packet, where the address of the substitute description is given in the payload. FIG. 5 shows an example of packet generated by a TCP multiplexer, where CN is the channel number and length is the total length of the TCP frame. FIG. 6 illustrates an example of control packet generation. Part of the channel 1 has been pruned, and a control packet is inserted in place of the discarded media information. The control packet has a negative length, and the payload is replaced by the channel number where the media information has to be picked to form a continuous stream.

Although illustrative embodiments of the present invention have been described herein with reference to the accompanying drawings, it is to be understood that the invention is not limited to those precise embodiments, and that various other changes and modifications may be affected therein by those of ordinary skill in the pertinent art without departing from the scope or spirit of the present invention.

What is claimed is:

1. A system for streaming media information via a network to heterogeneous clients, comprising:
   a broadcaster that receives media information, determines an encoding strategy for the media information, encodes a plurality of descriptions of the media information according to the encoding strategy, and transmits the descriptions along with control information; and
   a streaming server and receiver modeler that transmits one of the descriptions along with control information to at least one of the heterogeneous clients, and another of the descriptions along with control information to at least another of the heterogeneous clients, respectively, receives feedback from each of the heterogeneous clients, and thins at least one of the plurality of descriptions in accordance with the received feedback aggregated from each of the heterogeneous clients, wherein only one version of the plurality of descriptions is subsequently transmitted to the heterogeneous clients,
   wherein each of the heterogeneous clients receives one description for each data unit, but successive descriptions can come from different compressed bitstreams.

2. The system of claim 1, wherein the broadcaster determines the broadcasting strategy by determining characteristics of the descriptions based at least in part on transmission rate and encoding mode information.

3. The system of claim 1, wherein the descriptions include one or more data unit.

4. The system of claim 3, wherein a pruning algorithm is implemented to determine which data units are to be discarded.

5. The system of claim 4, wherein a data unit for a first description is discarded based on a correspondence with a data unit for a second description.

6. The system of claim 1, wherein the broadcaster includes a multiplexer for multiplexing the descriptions.

7. The system of claim 6, wherein the multiplexed descriptions are scheduled for transmission according to presentation deadlines.

8. The system of claim 1, wherein the media information includes one or more of a video signal and an audio signal.

9. The system of claim 1, wherein one or more client subscribe to one or more multicast group.

10. The system of claim 1, further comprising a streaming server for receiving the descriptions and the control information and assembling media streams from the descriptions using the control information.

11. The system of claim 10, wherein quality of service perceived by clients is maintained.

12. The system of claim 10 wherein at least one of the assembled media streams comprises thinned media.

13. The system of claim 1 wherein said media information is indicative of live media.

14. The system of claim 1 wherein the transmitted descriptions collectively correspond to thinned media.

15. A method for streaming media information from a streaming system comprising a broadcaster connected to a streaming server, via a hardware network infrastructure to connected heterogeneous clients, comprising:
   receiving media information by the broadcaster;
   determining an encoding strategy for the media information;
   encoding a plurality of descriptions of the media information, by an encoder of the broadcaster according to the encoding strategy;
   transmitting one of the descriptions along with control information over the network infrastructure to at least one of the heterogeneous clients, and another of the descriptions along with control information to at least another of the heterogeneous clients, respectively;
   receiving feedback at the streaming server from each of the heterogeneous clients responsive to the descriptions received by the respective heterogeneous clients; and
   thinning by a stream thinner of the broadcaster at least one of the plurality of descriptions in accordance with the received feedback aggregated from each of the heterogeneous clients, wherein only one version of the plurality of descriptions is subsequently transmitted to the heterogeneous clients,
   wherein each of the heterogeneous clients receives one description for each data unit, but successive descriptions can come from different compressed bitstreams.

16. The method of claim 15, wherein the step of determining an encoding strategy includes determining characteristics of the descriptions at least in part based on transmission rate and encoding mode.

17. The method of claim 15, wherein the descriptions include one or more data unit.

18. The method of claim 17, further comprising implementing a pruning algorithm to determine which data units are to be discarded.

19. The method of claim 18, wherein a data unit for a first description is discarded based on a correspondence with a data unit for a second description.

20. The method of claim 15, further comprising the steps of:
   receiving the descriptions and the control information; and
   assembling media streams from the descriptions using the control information.

21. The method of claim 20, wherein quality of service perceived by clients is maintained.

22. The method of claim 20 wherein at least one of the assembled media streams comprises thinned media.

23. The method of claim 15, wherein the descriptions are multiplexed.

24. The method of claim 23, wherein the multiplexed descriptions are scheduled for transmission according to presentation deadlines.

25. The method of claim 15, wherein the media information includes one or more of a video signal and an audio signal.

26. The method of claim 15, wherein one or more client subscribe to one or more multicast group.

27. The method of claim 15 wherein the media information is indicative of live media.

28. The method of claim 15 wherein the transmitted descriptions collectively correspond to thinned media.

29. A computer readable medium embodying instructions executed by a processor to perform method steps for streaming media information via a network to heterogeneous clients, the method steps comprising:

receiving media information;

determining an encoding strategy for the media information;

encoding a plurality of descriptions of the media information, according to the encoding strategy; and transmitting one of the descriptions along with control information to at least one of the heterogeneous clients, and another of the descriptions along with control information to at least another of the heterogeneous clients, respectively;

displaying media information responsive to the one of the descriptions on at least one of the heterogeneous clients, and media information responsive to the other of the descriptions on at least another of the heterogeneous clients, respectively;

receiving feedback from each of the heterogeneous clients; and thinning at least one of the plurality of descriptions in accordance with the received feedback aggregated from each of the heterogeneous clients, wherein only one version of the plurality of descriptions is subsequently transmitted to the heterogeneous clients, wherein each of the heterogeneous clients receives one description for each data unit, but successive descriptions can come from different compressed bitstreams.

30. A computer readable medium embodying instructions executed by a processor to perform a method for thinning media information for heterogeneous clients, the method comprising the steps of:

receiving media information;

determining an encoding strategy for the media information;

encoding a plurality of descriptions of the media information according to the encoding strategy; and assembling media streams from the descriptions wherein at least one of the assembled media streams comprises thinned media;

transmitting one of the descriptions along with control information to at least one of the heterogeneous clients, and another of the descriptions along with control information to at least another of the heterogeneous clients, respectively;

displaying media information responsive to the one of the descriptions on at least one of the heterogeneous clients, and media information responsive to the other of the descriptions on at least another of the heterogeneous clients, respectively;

receiving feedback from each of the heterogeneous clients; and thinning at least one of the plurality of descriptions in accordance with the received feedback from each of the heterogeneous clients, wherein only one version of the plurality of descriptions is subsequently transmitted to the heterogeneous clients, wherein each of the heterogeneous clients receives one description for each data unit, but successive descriptions can come from different compressed bitstreams.

31. A method as defined in claim 30, further comprising transmitting at least one assembled media stream comprising thinned media to heterogeneous clients.

32. A method as defined in claim 31 wherein the thinned media is transmitted via streaming over a network.

33. A method as defined in claim 31 wherein each of the heterogeneous clients receives a media stream compatible with its respective processing and bandwidth requirements.

* * * * *